Jan. 23, 1968     R. E. HOOK     3,364,731
CONDENSATE LEVEL RESPONSIVE BATCH DISTILLATION
Filed Dec. 14, 1964     2 Sheets-Sheet 1

INVENTOR.
Roy E. Hook
BY
*Manford R. Hayton*
ATTORNEY

United States Patent Office 3,364,731
Patented Jan. 23, 1968

3,364,731
CONDENSATE LEVEL RESPONSIVE
BATCH DISTILLATION
Roy E. Hook, Griffith, Ind., assignor to Standard Oil
Company, Chicago, Ill., a corporation of Indiana
Filed Dec. 14, 1964, Ser. No. 418,012
7 Claims. (Cl. 73—61.3)

ABSTRACT OF THE DISCLOSURE

A method and apparatus for determining ASTM distillation characteristics of petroleum distillates. Distillate from batch distillation of a liquid is passed into a receiver vessel, the bottom of which is provided with a slideably-fitted liquid-tight piston. The piston is moved at a rate required to maintain the liquid level in the vessel substantially constant. The rate of movement of the piston provides a measure of the distillation rate and the position of the piston in the vessel provides a measure of the quantity of distillate received.

This invention relates to the automatic distillation and determination of the temperature versus volume-distilled characteristics of liquids. More specifically, the invention relates to a system for measuring and recording the temperature versus volume-distilled characteristics of hydrocarbon mixtures and the like.

In the production of petroleum distillates, the primary specifications include those based on distillation properties. The petroleum industry has set up a standard test method for determining distillation characteristics of petroleum distillates which has been adopted by the American Petroleum Institute and the American Society for Test Materials (ASTM). This test has been designated ASTM D-86.

Limitations are placed upon the distillation characteristics of products, such as gasolines, kerosenes, heater oils, etc. in order to control volatility, burning characteristics, etc. There is considerable economic incentive to produce distillates having distillation characteristics as close to the specification limit as possible. In order to approach such specification limits, it has been the practice to make laboratory analyses of grab samples, but such laboratory control of processing involves such long time lags between sampling, analysis, reporting, and adjustment of the process unit, that close control of the process has been impossible. Consequently, the specification limit could not be as closely approached as might be desired because of the danger of producing off-specification product while waiting for the laboratory results.

Devices for determining ASTM distillation characteristics of petroleum distillates have heretofore been proposed but such prior devices have relatively narrow range, are not adapted for continued and repeated tests, or do not provide for reproducing the ASTM D-86 distillation characteristics of the sample within ASTM accuracy limits. There are commercial instruments available which will produce data which "correlate" within ASTM accuracy for reproducibility of ASTM D-86 data, however, most of these instruments monitor only one or two points on the distillation curve. During the distillation, some of the sample is lost as vapor, especially during testing of the more volatile materials such as gasoline, therefore the amount of liquid collected in the receiver is less than the amount distilled from the flask. In order to be consistent with the ASTM D-86 test, the term "volume collected" is used herein to correspond to the "percent recovered" term used in the ASTM D-86 procedure.

It is a primary object of this invention to provide a system for automatic ASTM-type analysis which can aid in reducing the time lag between sampling and process control. It is a further object of the invention to provide automatic apparatus for obtaining data which is essentially the equivalent of data obtained by the ASTM D-86 test.

The present invention provides an automatic system for effecting batch distillation of a liquid and reporting the temperature-volume collected characteristics of the liquid, comprising a chamber adapted to hold liquid, heating means adapted to heat the chamber, a distillate receiver having a distillate-containing zone, condenser means for transferring said distillate from said chamber to said receiver, thermocouple means in the chamber responsive to vapor temperatures therein, liquid level sensing means adapted to produce a level signal in response to the position of the liquid level in the receiver, means adapted to vary the volume of said distillate-containing zone in response to said level signal to maintain the liquid level in the receiver substantially constant during the distillation, volume sensing means adapted to produce a volume-collected signal in response to the volume of said distillate-containing zone, an output signal means responsive to said thermocouple means and said volume-collected signal for producing an output signal representative of the temperature-volume collected characteristics of the liquid sample.

The present invention further provides an automatic system for controlling and recording the distillation of a liquid, comprising a chamber adapted to hold the liquid, heating means adapted to heat the chamber, a distillate receiver having a distillate-containing zone, condenser means for transferring distillate from said flask to said receiver, thermocouple means in the chamber responsive to vapor temperatures therein, piston means in said receiver adapted to vary the volume of the distillate-containing zone, liquid level sensing means adapted to produce a level signal in response to a change of liquid level in the receiver, piston moving means adapted to move the piston to change the volume of the distillate-containing zone in response to the level signal to maintain the liquid level in the receiver substantially constant during the distillation, piston position sensing means adapted to produce a volume-collected signal which is related to the position of the piston, and recorder means responsive to the thermocouple means and the volume-collected signal for producing a temperature-volume collected record of said liquid.

The invention provides further a distillate receiving system, for use in combination with apparatus for effecting batch distillation of liquid and condensation of the resulting vapors, comprising a chamber having a distillate-containing zone, said chamber being provided with inlet means for receiving distillate into said distillate-containing zone, liquid level sensing means adapted to produce a level signal in response to the position of the liquid level in said receiver, means adapted to change the volume of said distillate-containing zone in response to said level signal to maintain said liquid level in said distillate-containing zone substantially constant, and volume sensing means adapted to sense the volume of said distillate-containing zone and produce a volume-collected signal.

The invention still further provides, in combination with apparatus for effecting batch distillation of liquid and condensation of the resulting vapors to produce distillate, a distillate receiving system comprising a substantially vertical cylindrical chamber adapted to receive said distillate, linear displacement transducer means surmounting said chamber, a float in said chamber adapted to float in said distillate operativtly connected to said transducer, piston means in the bottom portion of said chamber in liquid-tight relationship thereto adapted to move within said chamber to vary the volume thereof, electric motor means adapted to move said piston within said chamber, controller means adapted to receive a signal from said transducer and control said motor to move said piston in said chamber in response to said signal and maintain the liquid level in said chamber substantially constant, and indicator means adapted to indicate the position of said piston, said position providing a measure of the volume of distillate within said chamber.

The invention also provides a method for determining the distillation rate and quantity of distillate received during batch distillation of liquid, whch method comprises passing distillate from said distillation into a receiver vessel provided with a slideably-fitted liquid-tight piston in the bottom thereof, and moving said piston at a rate required to maintain the liquid level in said vessel substantially constant, the rate of movement of said piston providing a measure of the distillation rate and the position of said piston providing a measure of the quantity of distillate received.

Briefly, according to the invention, I provide an automatic batch-type instrument which automatically draws a sample, distills and collects it, detects and indicates and/or records percent-recovered versus temperature over the complete ASTM D–86 curve or a portion thereof and/or provides temperature values for preselected percent collected points.

Figure 1:
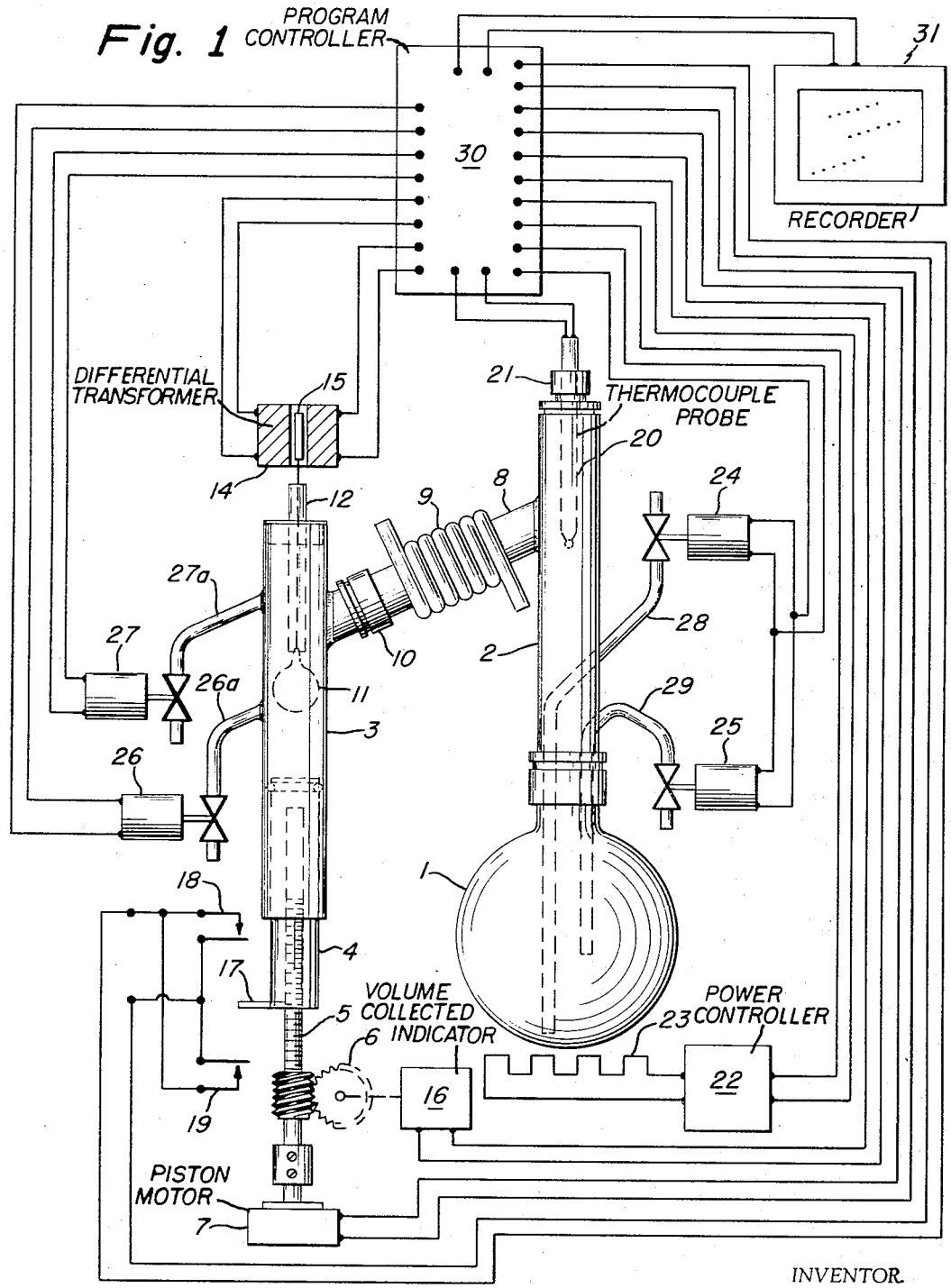
FIGURE 1 is a schematic representation of a preferred embodiment of apparatus for collecting a hydrocarbon distillate sample, distilling the sample, and producing volume-collected versus temperature data characteristic of that determined by the ASTM D–86 test.
Figure 2:
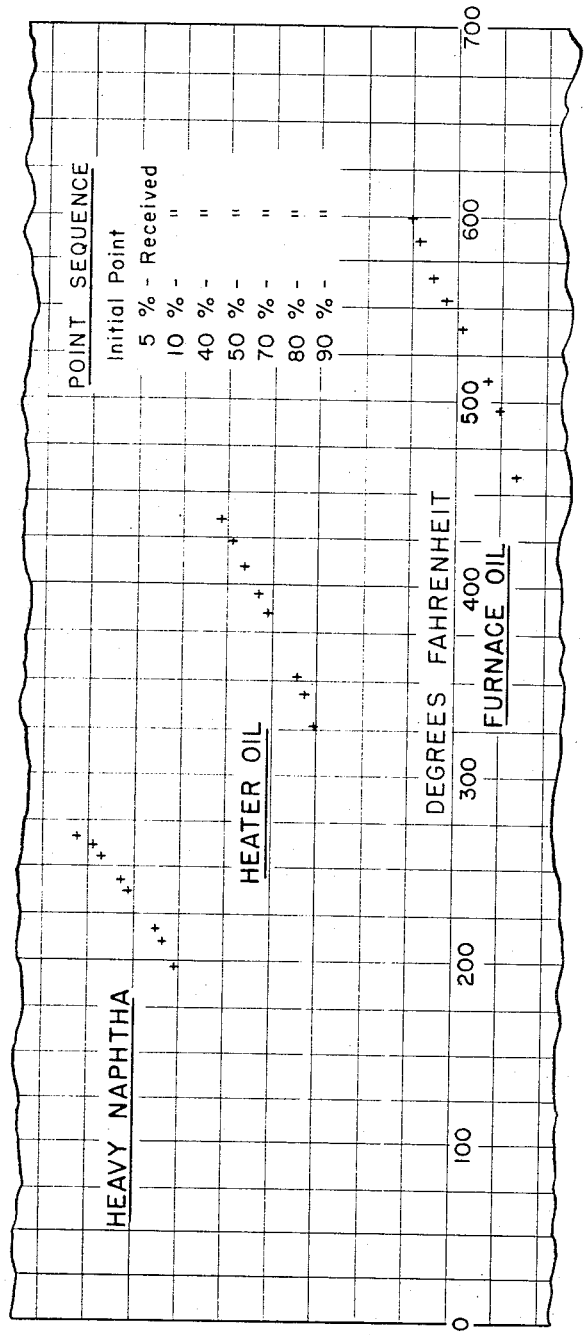
FIGURE 2 is a representation of a portion of the data record produced by the recorder of a specific embodiment of my invention showing temperature data points at preselected volume-collected points during autoamtic sequential distillations of samples of heavy naphtha, heater oil and furnace oil.

Turning now to FIGURE 1, a specific embodiment of the invention which automatically draws a sample, conducts the distillation and records the data, then draws another sample and repeats the cycle, will be described starting at the point in the sequence of operations where distillation of the previously drawn sample has been completed and the unit prepares itself to draw a new sample for distillation.

Downward movement of receiver piston 4, which is described below, causes actuator pin 17 to close limit switch 19, sending a signal to program controller 30. A suitable program controller is one manufactured by Tenor Company, model A–31–EZ–30, which has added thereto a time delay switch and an ACROMAG Model 2377 relay for connection with the differential transformer 14, described below. Program controller 30 increases the control current input to heater power controller 22, which responds to increase the power to flask heater 23. A suitable heater power controller is one manufactured by Research Inc., model 10–1 LABAC. Upon closing of limit switch 19, program controller 30 establishes a time delay during which the last remaining liquid in distillation flask 1 is vaporized and thermocouple probe 20 senses the maximum, or end-point, temperature. Upon completion of the time delay, program controller 30 places the instrument in "standby" mode: program controller 30 switches sample valve 24 into the next stream to be analyzed and establishes a heater power range for heater power controller 22 based upon the known general characteristics of the next process stream. Cycle-timer-operated "start" switch circuit is activated, opening sample valve 24 to flush liquid through flask 1, thus cooling the distillation assembly and removing any residue remaining from the previous sample. Siphon valve 25 and overflow valve 27 in line 27a are also opened by signals from program controller 30.

Upon closure of program controller 30 cycle-timer-operated "start" switch, piston motor 7 receives power from program controller 30 to drive piston 4 up into receiver 3 by rotating lead screw 5. As piston 4 moves upward, the liquid in receiver 3 is displaced by the piston and the liquid lever rises. The rise in liquid level displaces float 11 and float-coupled differential transformer core 15 upward. Upward movement of differential transformer core 15 in differential transformer 14 poduces a positive EMF in the secondary winding of differential transformer 14 which is detected by program controller 30. Upon receipt of a positive EMF from differential transformer 14, program controller 30 opens receiver liquid leveling valve 26, allowing liquid to flow from receiver 3 to drain through leveling line 26a and valve 26. The volume rate of liquid flow to drain through valve 26 and line 26a is purposely made greater than the liquid volume displacement rate due to movement of receiver piston 4 in receiver 3. Thus, when leveling valve 26 is opened, the liquid level in the receiver begins to drop. Leveling valve 26 remains open until the receiver 3 liquid level has dropped sufficiently to reduce the positive EMF in differential transformer 14 secondary winding to zero, or a small negative value. Loss of positive EMF in transformer 14 secondary winding causes program controller 30 to close leveling valve 26, allowing receiver liquid level to again move upward as a result of piston displacement. This process continues until top limit switch 18 is closed by piston switch-activator 17. Volume-collected detector 16, which can be a slide-wire potentiometer or a cam-operated switch assembly, follows the movement of piston 4 through worm gear 6. When piston switch-actuator 17 closes limit switch 18, volume-collected detector 16 has been indexed to starting conditions with its output indicating zero liquid received.

Closure of top limit switch 18 by piston switch-actuator 17 causes program controller 30 to close sample valve 24, stop piston motor 7 and begin a short time delay during which final leveling of liquid in receiver 3 through leveling line 26a, and siphoning to a fixed liquid volume in flask 1 through line 29 is accomplished. At the end of the time delay, program controller 30 closes siphon valve 25, overflow valve 27 and leveling valve 26. Simultaneously, program controller 30 supplies a small direct current to heater power controller 22, which in turn delivers power to flask heater 23.

As heat from flask heater 23 is applied to flask 1 and its contents, the liquid sample begins to boil, the lower-boiling components of the sample vaporizing first. When hot vapors reach thermocouple probe 20, the temperature of the probe is increased. At a pre-determined temperature value, conveniently 125–150° F., program controller 30 reduces the control current input to heater power controller 22, reducing the power delivered to heater 23 and consequently reducing the heat supplied to flask 1 and its contents. As the liquid in flask 1 continues to boil, vapors move into distillation head side-arm condenser 8 which is cooled by water flowing through tubing 9. Vapors appearing in the cool zone of condenser 8 are cooled below their boiling point, and condense. This condensate flows by gravity from the condenser 8 into receiver 3, causing a rise in receiver 3 liquid level. Upward movement of liquid in receiver 3 causes upward movement of float 11 and float-coupled transformer core 15, creating a positive EMF in the secondary winding of transformer 14. The appearance of a positive EMF in the secondary winding of transformer 14 is detected by program controller 30 which actuates piston-motor 7. Volume-collected indicator 16 follows the movement of piston 4 through worm gear 6 and sends to program-controller 30 an EMF signal which is proportional in value to the linear movement of piston 4 and consequently, is proportional to volume of liquid which has arrived in the receiver. Program controller 30 proportions the EMF output from volume-collected indicator 16 to starting sample volume in flask 1 and sends a signal to recorder 31 representative of volume percent of sample which has arrived in the receiver. Program controller 30 integrates the signal from volume-collected indicator 16 in increments and sends pulse signals to the print actuator mechanism of printing recorder 31, which prints a temperature value upon receipt of a print-demand pulse. Each pulse delivered by program controller 30 to printing recorder 31 represents a discrete value of volume percent of sample received by receiver 3. The volume percent points monitored are pre-selected by positioning of switch actuator dogs on volume-collected indicator 16 cam which couples through worm gear 6 to motor 7. Downward movement of piston 4 is followed by float-coupled transformer core 15, causing the EMF in the secondary of transformer 14 to drop to zero. On loss of positive EMF from transformer 14, program controller 30 turns off motor 7 to stop the motion of piston 4. The rate of heat input to flask 1 and contents, and speed of motor 7 are selected such that piston 4 volume displacement rate is equal to or greater than the volume rate at which the liquid distills and arrives in receiver 3. Thus, a null-seeking process is established whereby a change in liquid level in receiver 3 due to distillate receipt is detected by transformer 14 and compensated by movement of piston 4 by motor 7. The procedure continues throughout the distillation until the maximum or end-point temperature is reached. The liquid level detector system sensitivity for motor 7 actuation is approximately 0.05 mm.

Distillation rate is partially controlled by supplying a small fraction of transformer 14 output to heater power controller 22 such that an upward movement core 15 in transformer 14 causes a decrease in power delivered by heater power controller 22 to heater 23.

The distillation procedure continues until sufficient liquid has arrived in receiver 3 to drive piston 4 down to the point at which limit switch actuator 17 closes bottom limit switch 19. The position of bottom limit switch 19 determines the volume percent received (percent-off) at which the distillation is discontinued. For the complete distillation through end-point, bottom limit switch 19 is positioned such that it is closed by switch actuator 17 upon arrival of 92–95% of the sample in receiver 3. The 90-second time delay period following actuation of bottom limit switch 19 permits the remaining sample to distill and thermocouple probe 20 to reach a maximum or end-point temperature.

Completion of the 90-second delay following closure of bottom limit switch 19 completes the cycle and establishes conditions for starting the next analysis.

The instrument herein described is equally capable of producing accurate information as a continuous stream analyzer in the plant, or as a batch analyzer in the laboratory. This instrument is capable of producing a continuous ASTM distillation curve, or a number of temperature points at preselected volume-distilled points on the ASTM curve.

The operation of a laboratory model of the instrument is essentially the same as that described above for the automatic sampling model. In this embodiment, the sample to be distilled is placed in a container connected to sample valve 24 and the "start" circuit is energized by pressing a start button switch. The heat range to be employed initially by the instrument can be selected by providing heat range switches employing circuitry apparent to those skilled in the art.

The analysis time required by the described embodiment of the instrument is approximately 15 minutes. When operated as a continuous-batch analyzer in a process stream, this short hold-up of information increases process control efficiency considerably. The output of this instrument can, if desired, be fed directly into an electronic computer and be used for computer-control of the process which is being sampled by the instrument. Used in the laboratory as a batch analyzer, the instrument will complete from 3 to 4 distillations in the time required for one standard ASTM analysis by one operator using the conventional manual technique. This can result in a reduction of sample backlog and an increase in the accuracy of the data by replication without loss of time. Since the analyst is required only to provide sample to the instrument, much of his time can be diverted to other, more fruitful activities.

Although the invention has been described with reference to specific embodiments thereof, it should be understood that these are by way of illustration only and that modifications are contemplated without departing from the spirit of the invention.

What is claimed is:

1. An automatic system for effecting batch distillation of a liquid and reporting the temperature-volume collected characteristics of said liquid, comprising a chamber adapted to hold said liquid, heater means adapted to heat said chamber, a distillate receiver having a distillate-containing zone, condenser means for transferring distillate from said chamber to said receiver, thermocouple means in said chamber responsive to vapor temperatures therein, liquid level sensing means adapted to produce a level signal in response to the position of the liquid level in said receiver, means adapted to vary the volume of said distillate-containing zone in response to said level signal to maintain the liquid level in said receiver substantially constant during said distillation, volume sensing means adapted to produce a volume-collected signal in response to the volume of said distillate-containing zone, and output signal means responsive to said thermocouple means and said volume-collected signal for producing an output signal representative of the temperature-volume collected characteristics of said liquid.

2. An automatic system for controlling and recording the distillation of a liquid, comprising a chamber adapted to hold said liquid, heater means adapted to heat said chamber, a distillate receiver having a distillate-containing zone, condenser means for transferring distillate from said chamber to said receiver, thermocouple means in said chamber responsive to temperatures therein, piston means in said receiver adapted to vary the volume of said distillate-containing zone, liquid level sensing means adapted to produce a level signal in response to a change of liquid level in said receiver, piston moving means adapted to move said piston to change the volume of said distillate-containing zone in response to said level signal to maintain the liquid level in said receiver substantially constant during said distillation, piston position sensing means adapted to produce a volume-collected signal relative to the position of said piston, and recorder means responsive to said thermocuple means and said volume-collected signal for producing a temperature-volume collected record of said liquid.

3. An automatic system for controlling and indicating batch distillation of liquid, comprising a flask adapted to hold said liquid, heater means adapted to heat said flask, a distillate receiver having a distillate-containing zone, condenser means for condensing vapors from said flask and transferring distillate to said receiver, thermocouple means for detecting the temperature of vapors leaving said flask, piston means in said receiver adapted to vary the volume of said distillate-containing zone, liquid level sensing means in said receiver comprising a float, differential transformer means having a movable transformer core operatively connected to said float, said transformer being adapted to produce a level signal in response to a change in position of said float, piston moving means comprising an electric motor adapted to move said piston to vary the volume of said distillate-containing zone in response to said level signal and maintain the liquid level in said receiver substantially constant during said distillation, piston position sensing means adapted to produce a volume-collected signal relative to the position of said piston, and indicator means responsive to said thermocouple and said volume-collected signal for indicating the temperature-volume collected characteristics of said liquid.

4. An automatic apparatus for effecting, controlling, and recording the distillation of a liquid, comprising a flask adapted to hold said liquid, heater means adapted to heat said flask, inlet conduit means for transferring liquid to be distilled into said flask, a distillation head surmounting said flask for receiving distillate vapors therefrom, thermocouple means for sensing the temperature of said vapors, condenser means adapted to receive said vapors from said head and effect condensation thereof to porduce condensate, a distillate receiver having a distillate-containing zone adapted to receive and contain distillate from said condenser, piston means in said receiver adapted to increase the volume of said zone as distillation progresses to maintain the liquid level in said receiver substantially constant, float means in said receiver, differential transformer means having a movable core operatively connected to said float adapted to produce a liquid level signal indicative of the liquid level in said receiver, electric motor drive means adapted to move said piston, piston-position sensing means comprising a potentiometer adapted to produce a piston-position signal, programmer means adapted to receive said level signal and control the operation of said motor in response thereto to maintain said liquid level substantially constant, indicator means adapted to receive a temperature signal from said thermocouple and a volume-collected signal from said potentiometer and indicate the temperature-volume collected characteristics of said liquid during distillation thereof.

5. In combination with apparatus for effecting batch distillation of liquid and condensation of the resulting vapors, the distillate receiving system comprising a chamber having a distillate-containing zone, said chamber being provided with inlet means for receiving distillate into said distillate-containing zone, liquid level sensing means adapted to produce a level signal in response to the position of the liquid level in said receiver, means adapted to change the volume of said distillate-containing zone in response to said level signal to maintain said liquid level in said distillate-containing zone substantially constant, volume sensing means adapted to sense the volume of said distillate-containing zone and produce a volume-collected signal.

6. In combination with apparatus for effecting batch distillation of liquid and condensation of the resulting vapors to produce distillate, the distillate receiving system comprising a substantially vertical cylindrical chamber adapted to receive said distillate, linear displacement transducer means surmounting said chamber, a float in said chamber adapted to float in said distillate operatively connected to said transducer, piston means in the bottom portion of said chamber in liquid-tight relationship thereto adapted to move within said chamber to vary the volume thereof, electric motor means adapted to move said piston within said chamber, controller means adapted to receive a signal from said transducer and control said motor to move said piston in said chamber in response to said signal and maintain the liquid level in said chamber substantially constant, and indicator means adapted to indicate the position of said piston, said position providing a measure of the volume of distillate within said chamber.

7. A method for determining the distillation rate and quantity of distillate received during batch distillation of liquid, which method comprises passing distillate from said distillation into a receiver vessel, moving a piston from the bottom of said vessel at a rate required to maintain the liquid level in said vessel substantially constant, the rate of movement of said piston providing a measure of the distillation rate and the position of said piston providing a measure of the quantity of distillate received.

References Cited

UNITED STATES PATENTS

| | | | |
|---|---|---|---|
| 1,863,346 | 6/1932 | Moore et al. | 202—160 XR |
| 1,953,716 | 4/1934 | Josten. | |
| 2,577,615 | 12/1951 | Garrison et al. | 196—132 XR |
| 2,851,404 | 9/1958 | Jackson et al. | 196—132 XR |
| 3,094,468 | 6/1963 | Topham | 202—160 |
| 3,269,919 | 8/1966 | Baily et al. | 202—160 |

NORMAN YUDKOFF, *Primary Examiner.*

D. EDWARDS, *Assistant Examiner.*